US012334040B2

(12) United States Patent
Tan et al.

(10) Patent No.: US 12,334,040 B2
(45) Date of Patent: Jun. 17, 2025

(54) ROLLABLE CHORDOPHONE CASE

(71) Applicant: Mono Creators, Inc., Sherman Oaks, CA (US)

(72) Inventors: Kenneth Wei Jin Tan, Singapore (SG); Kevin Kam Hang Li, Singapore (SG); Jun Seng Lee, Hong Kong (CN)

(73) Assignee: Mono Creators, Inc., Sherman Oaks, CA (US)

( * ) Notice: Subject to any disclaimer, the term of this patent is extended or adjusted under 35 U.S.C. 154(b) by 8 days.

(21) Appl. No.: 18/569,798

(22) PCT Filed: Jul. 6, 2022

(86) PCT No.: PCT/US2022/036164

§ 371 (c)(1),
(2) Date: Dec. 13, 2023

(87) PCT Pub. No.: WO2023/287612

PCT Pub. Date: Jan. 19, 2023

(65) Prior Publication Data

US 2024/0135904 A1 Apr. 25, 2024

Related U.S. Application Data

(60) Provisional application No. 63/221,097, filed on Jul. 13, 2021.

(51) Int. Cl.

| | |
|---|---|
| ***G10G 7/00*** | (2006.01) |
| ***A45C 5/14*** | (2006.01) |
| ***A45F 3/00*** | (2006.01) |
| ***A45F 3/04*** | (2006.01) |

(52) U.S. Cl.

CPC ............. *G10G 7/005* (2013.01); *A45C 5/143* (2013.01); *A45F 3/04* (2013.01); *A45F 2003/003* (2013.01)

(58) Field of Classification Search

CPC . A45C 5/143; A45C 15/00; A45F 3/04; A45F 2003/003; G10G 7/00; G10G 7/005; G10G 7/02

USPC .................................................... 206/14, 314

See application file for complete search history.

(56) References Cited

U.S. PATENT DOCUMENTS

| | | | | |
|---|---|---|---|---|
| 6,598,772 | B1 | 7/2003 | Wilfer | |
| 6,812,393 | B1 | 11/2004 | Wilfer | |
| 7,687,701 | B1 | 3/2010 | Kushner | |
| 9,858,906 | B2 * | 1/2018 | Visesnut | G10G 7/005 |
| 12,008,980 | B2 * | 6/2024 | Ritter | G10G 7/005 |
| 2015/0310842 | A1 * | 10/2015 | Coburn | G10G 7/005 206/314 |
| 2017/0018263 | A1 | 1/2017 | Visesnut et al. | |
| 2020/0111460 | A1 | 4/2020 | Klosowiak | |

OTHER PUBLICATIONS

International Search Report and Written Opinion, PCT Application No. PCT/US2022/036164, mailed Oct. 11, 2022 (6 pages).

* cited by examiner

*Primary Examiner* — Bryon P Gehman

(74) *Attorney, Agent, or Firm* — Occhiuti & Rohlicek LLP

(57) ABSTRACT

A chordophone case includes a detachable wheel assembly that is configured to be attached to and detached from front and rear anchors on the case's front and rear faces. A wheel is mounted on a fork mount having a base and sidewalls that project therefrom to form an acute angle relative to the base. The detachable wheel assembly's frontward and rearward strap is anchored to the base and configured for attachment to the case.

19 Claims, 5 Drawing Sheets

ROLLABLE CHORDOPHONE CASE

CROSS REFERENCE TO RELATED APPLICATIONS

This application is a national phase under 35 USC 371 of International Application No. PCT/US2022/036164, filed Jul. 6, 2022, which claims priority to and the benefit of the filing date of U.S. Application No. 63/221,097, filed on Jul. 13, 2021, the contents of all of which are hereby incorporated by reference in their entireties.

TECHNICAL FIELD

The invention relates to musical instruments, and in particular, to cases for musical instruments.

BACKGROUND

When transporting a guitar, it is useful to place the guitar in a case. Such a case protects the guitar from impact and provides a place to store paraphernalia that is used when playing a guitar, such as picks, tuners, tuning bars, and spare strings.

Known guitar cases have devices that assist in carrying the case. Such devices include a handle as well as straps to enable the guitar to be carried on one's back.

In some cases, guitars are deceptively heavy. For example, although the body of a solid body guitar is small, it is quite dense and heavier than it appears. For this reason, it is preferable to be able to roll the case instead of carrying it.

Aside from the weight of the guitar itself, another difficulty that arises with carrying a guitar on one's back is that the guitar's neck is long. This is particularly true for a bass guitar. As a result, the top end of the case can be higher than a person's head. It is thus easy to accidentally hit such objects as door's head jamb, a low-hanging chandelier, or, in particularly unfortunate cases, a rapidly spinning electric fan.

To avoid this difficulty, certain guitar cases have been made with wheels, much like wheeled luggage. However, known wheels are inconvenient to use and somewhat fragile.

SUMMARY

In one aspect, the invention features a chordophone case with a wheel assembly. The chordophone case has opposed front and rear faces with corresponding front and rear anchors attached to the chordophone case's corresponding front and rear faces. A shoulder harness is attached to the rear face. The wheel assembly features a fork mount having a base and first and second sidewalls that project from the base in a projection direction that forms an acute angle relative to the base. An axle, which has a wall mounted thereon, extends between the sidewalls. The wheel assembly also includes a frontward strap and a rearward strap. The frontward strap has an anchored end and a free end, the anchored end being attached to a front edge of the base. The rearward strap has an anchored end and a free end, the anchored end being attached to a rear edge of the base. The frontward strap's free end is configured to be attached to the front anchor and the rearward strap's free end is configured to be attached to the rear anchor. The frontward strap and the rearward strap have lengths selected such that when the free ends are attached to the respective attachment points, the base is parallel to the rear side of the chordophone case.

Embodiments include those in which the free end of the frontward strap includes an attachment face having a touch fastener disposed thereon to permit the attachment face to fasten to itself. Examples of such touch fasteners include a hook-and-loop fastener and a hook-and-pile fastener.

In other embodiments, the free end of the rearward strap is attachable to the rearward strap by a touch fastener disposed on an attachment face of the rearward strap.

Also, among the embodiments are those in which the front anchor includes a strap and a loop. In such embodiments, the strap includes an anchored end that is attached to the front face and a free end that is attached to the strap after having been passed through the loop.

Still other embodiments include those in which the rear anchor includes a loop that is attached to the rear face and those in which the front anchor includes a loop that hangs from the front face by a variable distance.

In some embodiments, the wheel assembly is one of a pair of identical wheel-assemblies, the front anchor is one of a pair of identical front-anchors, the rear anchor is one of a pair of identical rear-anchors. The front-anchors are offset on either side of a line that bisects the chordophone case along a longitudinal axis thereof and the rear anchors are also offset on either side of the line.

Embodiments include those in which the frontward strap is attached to the front anchor and the rearward strap is attached to the rear anchor and those in which the frontward strap is detached from the front anchor and the rearward strap is detached from the rear anchor.

In still other embodiments. the wheel assembly extends from front anchor to the rear anchor and covers a portion of the footing.

Among the embodiments are those in which the wheel includes polyurethane, those in which the wheel includes nylon, those in which each of the straps includes polyester webbing, and those in which each of the straps includes a hook-and-loop fastener.

In other embodiments, the base includes a front slot extending along a front edge thereof and a rear slot extending along a rear edge thereof. In such embodiments, the anchored end of the frontward strap is attached to the frontward strap after having passed through the front slot and the anchored end of the rearward strap is attached to the rearward strap after having passed through the rear slot.

Also, among the embodiments are those in which the first and second sidewalls project in a rearward direction along which the rearward strap extends.

Yet other embodiments include a loop. In such embodiments, the free end of the frontward strap loops through the loop. When the wheel assembly is connected to the front anchor, a free end of the front anchor loops through the loop.

Still other embodiments are those in which the rearward strap is longer than the frontward strap.

These and other features of the invention will be apparent from the following detailed description and its accompanying figures, in which:

DESCRIPTION OF DRAWINGS

These and other features of the invention will be apparent from the following detailed description and the accompanying figures, in which.

Within the drawings, the same or corresponding reference numerals indicate the same or corresponding parts.

DETAILED DESCRIPTION

Figure 1:
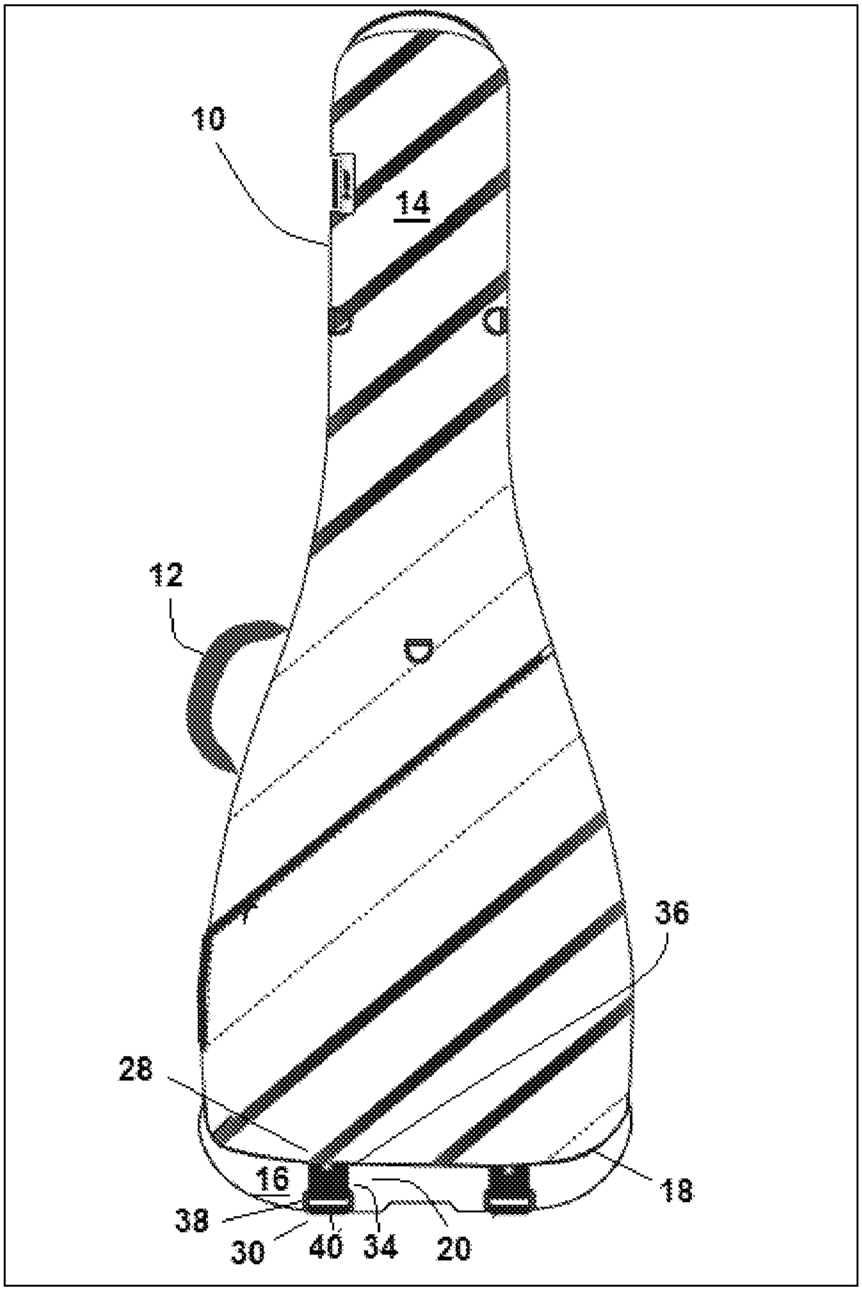
FIG. 1 shows a front face of a chordophone case configured for accommodating a guitar.

FIG. 1 shows a chordophone case 10 that is particularly configured for accommodating a guitar or other chordophone having a structure similar to the guitar. Examples of such chordophones include a bass, a cello, and a contrabass.

The illustrated case 10 includes a handle 12, a front face 14, and a footing 16 separated from the body by a seam 18. The guitar case 10 further includes a pair of front anchors 20 that are offset on either side of a midline that bisects the guitar case 10.

Figure 2:
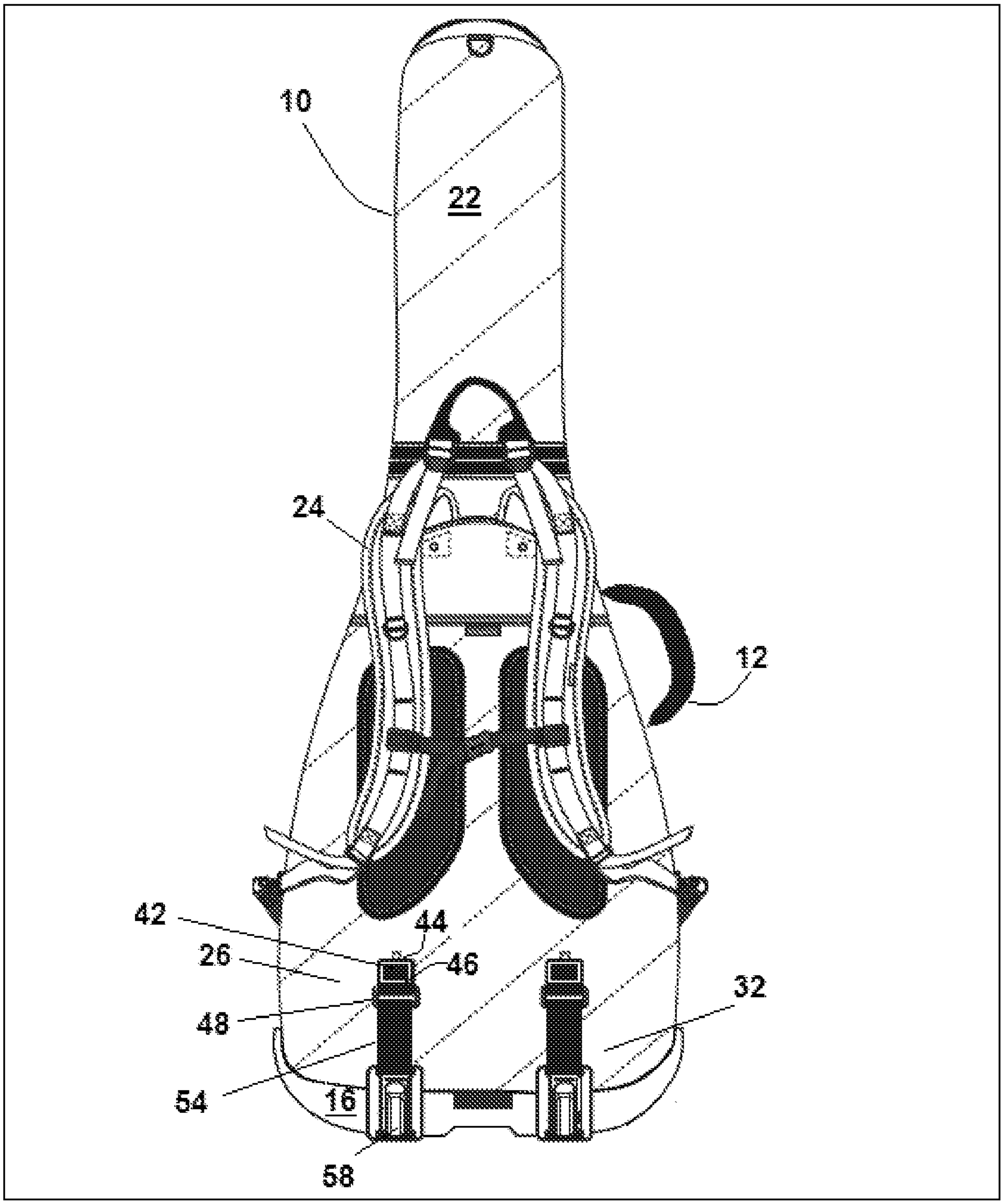
FIG. 2 shows a rear face of the chordophone case in FIG. 1.

FIG. 2 shows a rear face 22 of the same chordophone case 10. A shoulder harness 24 and a pair of rear anchors 26 attach to the rear face 22. Like the front anchors 20, the rear anchors 26 are offset on either side of the midline that bisects the chordophone case 10. The offset used for the rear anchors 26 is the same as that used for the front anchors 20.

Each of the front and rear anchors 20, 26 has an anchored end 28 and an attachment end 30. An anchor's anchored end 28 attaches to the chordophone case 10 and an anchor's attachment end 30 is used for attaching the front or rear anchor 20, 26 to a wheel assembly 32, which is best seen in FIG. 3.

In the illustrated embodiment, the front anchor 20 comprises a front-anchor strap 34 having a front-anchor-strap proximal end 36 and a front-anchor-strap distal end 38. The front-anchor-strap proximal end 36 has been sewn into the seam 18 at the front anchor's anchored end 28. The front-anchor-strap distal end 38 passes through a front loop 40 and is then sewn onto a distal portion of the front-anchor strap 34, thus forming a loop. This loop secures the front loop 40 to the front-anchor strap 34 and forms the front anchor's attachment end 30.

In the illustrated embodiment, the rear anchor 26 comprises a rear-anchor strap 42 having a rear-anchor-strap proximal end 44 and a rear-anchor-strap distal end 46. The rear-anchor-strap proximal end 44 has been sewn onto the rear face 22 at the rear anchor's anchored end 28. The rear-anchor-strap distal end 46 passes through a rear loop 48 and is then sewn onto a distal portion of the rear-anchor strap 42, thus forming a loop. This loop secures the rear loop 48 to the rear-anchor strap 42 and forms the rear anchor's attachment end 30.

Figure 3:
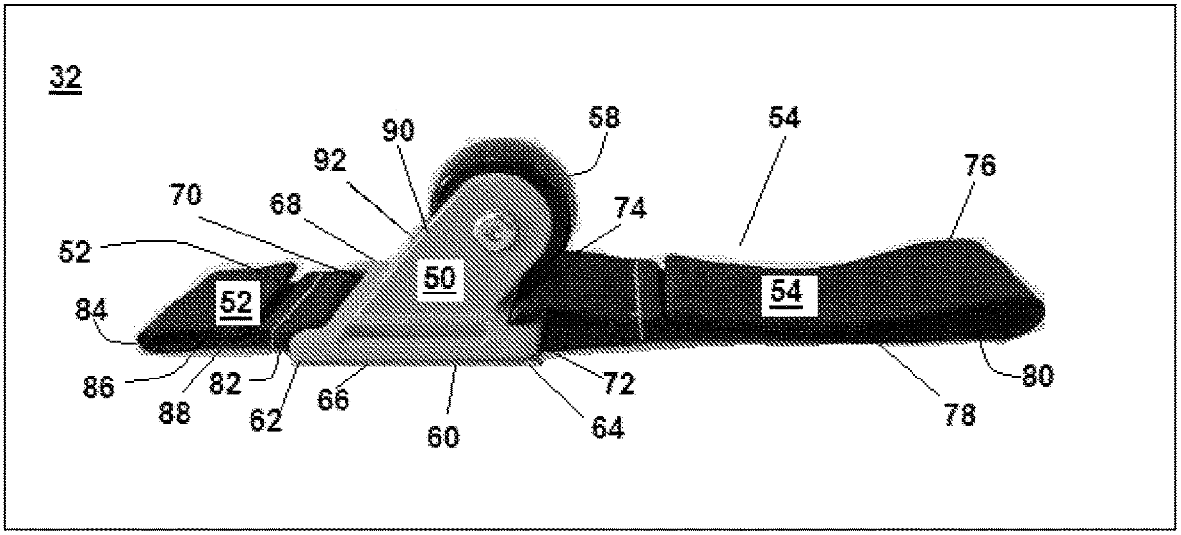
FIG. 3 shows a wheel assembly for attachment to and detachment from the chordophone case of FIG. 1.

As shown in FIG. 3, the wheel assembly 32 comprises a fork mount 50, a frontward strap 52, and a rearward strap 54. The frontward strap 52 and rearward strap 54 extend from the strap fitting 50 in opposite directions along a rolling axis RA that bisects the fork mount 50. An axle 56 extends across a distal end of the fork mount 50 and supports a wheel 58 that is oriented to roll along a rolling direction defined by the rolling axis RA. A transverse axis TA bisects the fork mount 50 in a direction parallel to that along which the axle 56 extends.

Figure 4:
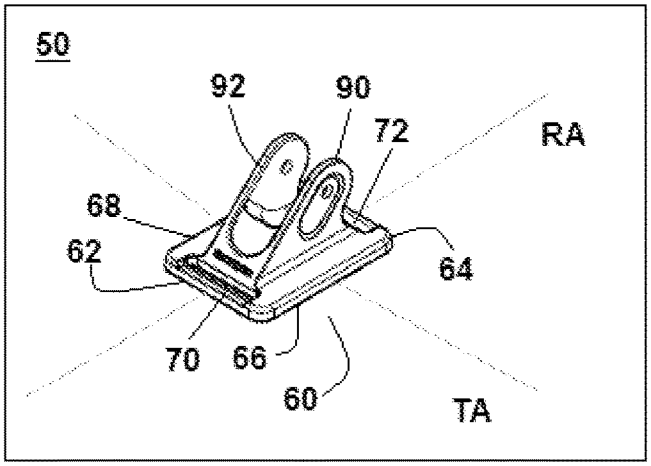
FIG. 4 shows details of the fork mount shown in FIG. 3.

Referring now to FIG. 4, the fork mount 50 features a rectangular base 60 having a front edge 62, a rear edge 64 that is parallel to the front edge 62, a left edge 66 that is perpendicular to the front edge 62, and a right edge 68 that is perpendicular to the front edge 62. A front slot 70 extends along the front edge 62 and a rear slot 72 extends along the rear edge 64.

Figure 5:
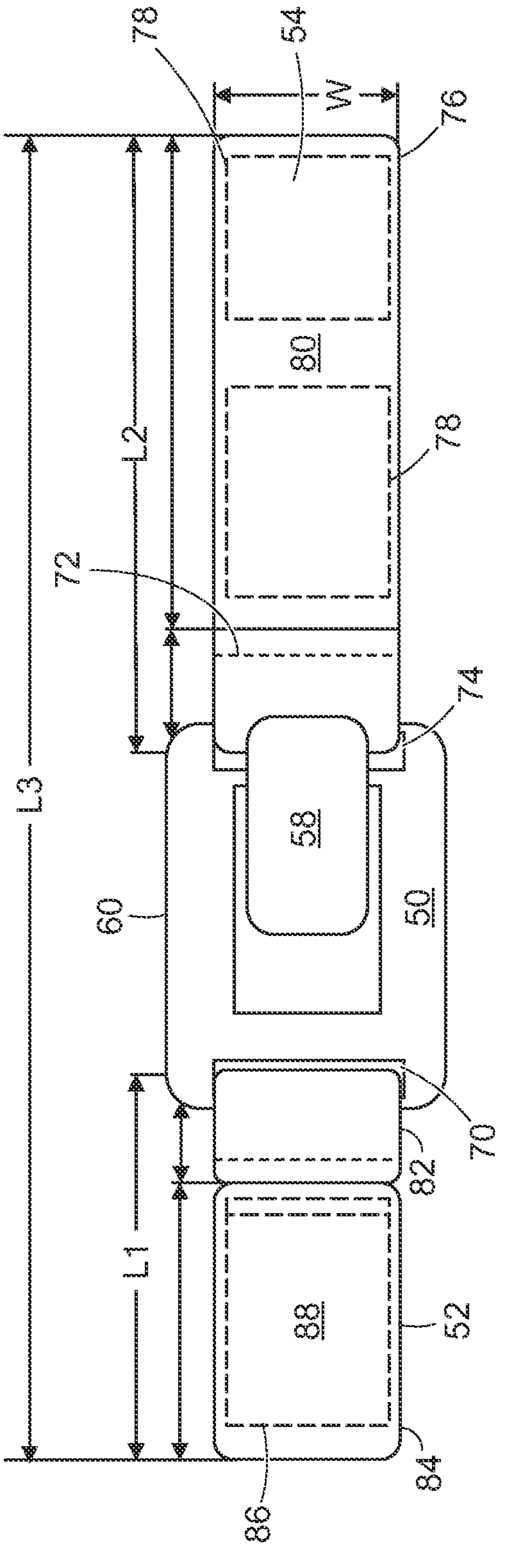
FIG. 5 is a top view of the wheel assembly shown in FIG.

As shown in FIG. 3 as well as FIG. 5, the rearward strap 54 has an anchored end 74 and a free end 76. The rearward strap's anchored end 74 is passed through the rear slot 72 and stitched to itself to form a permanent loop. This permanent loop anchors the rearward strap 54 to the fork mount 50. The rearward strap's free end 76 has a touch fastener 78 on an attachment face 80 thereof. The rearward strap's free end 76 is passed through the rear loop 48 and fastened to itself to form a detachable loop. This forms a detachable connection with the rear face 22 of the chordophone case 10.

While a variety of dimensions can be used, in some embodiments, the values of L1, L2, L3, and W shown in FIG. 5 are 3.125 inches, 5 inches, 10.75 inches, and 1.5 inches, respectively.

As used herein, a "touch fastener" includes such fasteners as hook-and-loop fasteners and hook-and-pile fasteners. Such touch fasteners are configured to temporarily fasten two surfaces by application of pressure and to cause surfaces thus fastened to become unfastened by application of a force in a direction opposite to that of the force that was used to apply the pressure.

The frontward strap 52 has an anchored end 82 and a free end 84. The frontward strap's anchored end 82 is passed through the front slot 70 and stitched to itself to form a permanent loop. This permanent loop anchors the frontward strap 52 to the fork mount 50. The frontward strap's free end 84 has a touch fastener 86 on an attachment face 88 thereof. The frontward strap's free end 84 is passed through the front loop 40 and fastened to itself to form a detachable loop. This forms a detachable connection with the front face 14 chordophone case 10.

Figure 6:
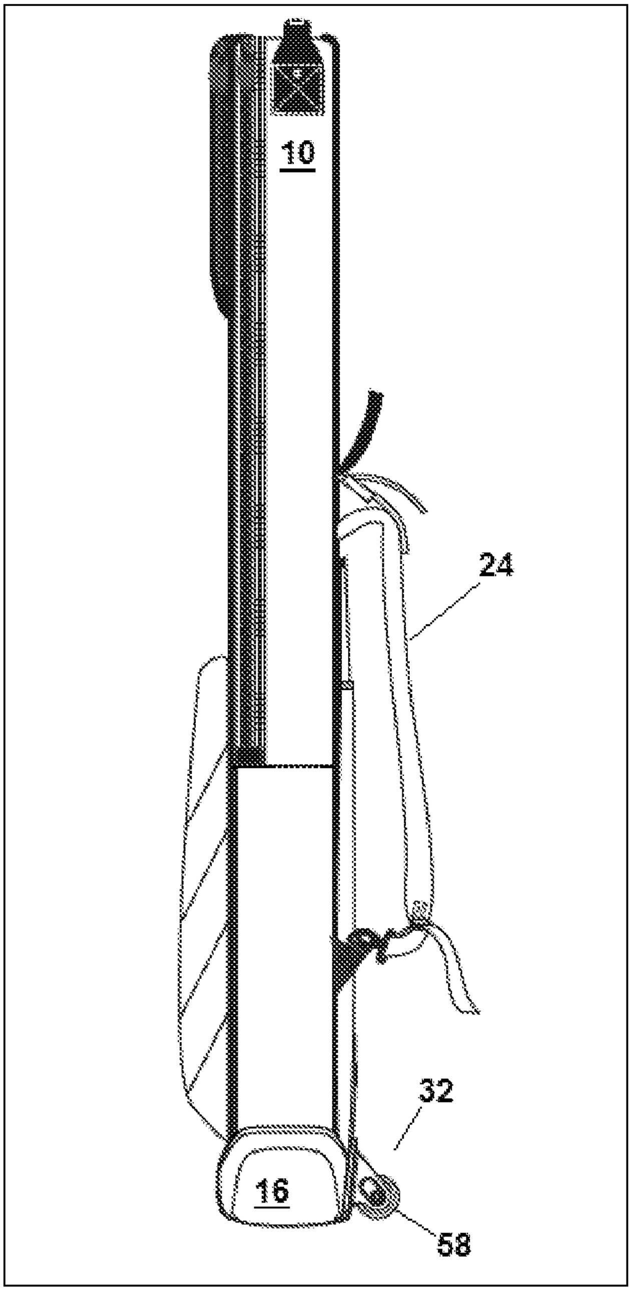
FIG. 6 shows a side-view of the chordophone case in FIG. 1.

The fork mount 50 comprises a first sidewall 90 and a second sidewall 92. The first sidewall 90 and the second sidewall 92 extend away from the base 60 along a direction that forms an oblique angle relative to a plane defined by the base 60 and in the direction along which the rearward strap 54 extends. As shown in FIG. 6, the oblique angle is selected such that the footing 16 and the wheel assemblies 32 cooperate to support the chordophone case 10 as shown in FIG. 6.

In some embodiments, the wheel 58 comprises polyurethane or nylon with a hub that comprises a thermoplastic polymer such as polycarbonate or acrylonitrile butadiene styrene and the various straps 34, 42, 52, 54 comprise polyester webbing. Because of its greater ruggedness, the use of polyurethane is particularly advantageous for use outdoors on potentially irregular and rougher rolling surfaces.

The chordophone case 10 is thus transformable between a wheeled state and an unwheeled state. To transform the chordophone case 10 into the wheeled state, one simply attaches the frontward and rearward straps 52, 54 to the corresponding front and rear anchors 20, 26 on the chordophone case 10. To transform the chordophone case 10 into the unwheeled state, one detaches the frontward and rearward straps 52, 54 and stows them in a convenient location they will be readily available. With the wheel assembly 32 having been thus removed, it is possible to use the shoulder harness 24 without the discomfort that may arise from the presence of the wheel assembly 32. The resulting multimodal chordophone case 10 can thus be transported using the shoulder harness 24, the handle 12, or the wheel assemblies 32.

In the illustrated embodiment, the touch fasteners 78, 86 are part of the wheel assembly 32 and the front and rear loops 40, 48 are part of the front and rear anchors 20, 26, respectively. However, in alternative embodiments, the touch fasteners are on the front and rear anchors 20, 26 and the front and rear loops 40, 48 are part of the wheel assembly 32. In a broad sense, the wheel assembly 32 is one that can be attached to and detached from the front and rear anchors 20, 26 with a level of ease that is comparable to that associated with attaching and detaching a strap from a briefcase.

The illustrated embodiment is a chordophone case that is specific to accommodating a guitar and similar lute-like instruments, including a banjo, a bass guitar, a cello, and a contrabass.

It is to be understood that the foregoing description is intended to illustrate and not to limit the scope of the invention, which is defined by the scope of the appended claims. Other embodiments are within the scope of the following claims.

What is claimed is:

1. An apparatus comprising a chordophone case, wherein said chordophone case comprises: a front face, a rear face opposite said front face, a footing between said front and rear faces on which said chordophone case rests, a front anchor attached to said front face, a rear anchor attached to said rear face, a shoulder harness that is attached to said rear face, and a detachable wheel assembly, said wheel assembly comprising: a fork mount having a base and first and second sidewalls that project from said base in a projection direction that forms an acute angle relative to said base, an axle extending between said first and second sidewalls, a wheel mounted to said axle, a frontward strap having an anchored end and a free end, said anchored end being attached to a front edge of said base, and a rearward strap having an anchored end and a free end, said anchored end being attached to a rear edge of said base, wherein said free end of said frontward strap is configured to be attached to said front anchor, wherein said free end of said rearward strap is configured to be attached to said rear anchor, and wherein said frontward strap and said rearward strap have lengths selected such that when said free ends are attached to respective attachment points, said base is parallel to said rear side of said chordophone case.

2. The apparatus of claim 1, wherein said free end of said frontward strap comprises an attachment face having a touch fastener disposed thereon to permit said attachment face to fasten to itself.

3. The apparatus of claim 2, wherein said touch fastener comprises a hook-and-loop fastener.

4. The apparatus of claim 2, wherein said touch fastener comprises a hook-and-pile fastener.

5. The apparatus of claim 1, wherein said free end of said rearward strap is attachable to said rearward strap by a touch fastener disposed on an attachment face of said rearward strap.

6. The apparatus of claim 1, wherein said front anchor comprises a strap and a loop, wherein said strap comprises an anchored end that is attached to said front face and a free end that is attached to said strap after having been passed through said loop.

7. The apparatus of claim 1, wherein said rear anchor comprises a loop that is attached to said rear face.

8. The apparatus of claim 1, wherein said front anchor comprises a loop that hangs from said front face by a variable distance.

9. The apparatus of claim 1, wherein said wheel assembly is a first wheel-assembly, wherein said front anchor is a first front-anchor, wherein said rear anchor is a first rear-anchor, and wherein said chordophone case further comprises a second rear-anchor identical to said first rear-anchor, a second front-anchor identical to said first front-anchor, and a second wheel-assembly that is identical to said first wheel-assembly, wherein said first and second front-anchors are offset on either side of a line that bisects said chordophone case along a longitudinal axis thereof, and wherein said first and second rear anchors are offset on either side of said line.

10. The apparatus of claim 1, wherein said frontward strap is attached to said front anchor and said rearward strap is attached to said rear anchor.

11. The apparatus of claim 1, wherein said frontward strap is detached from said front anchor and said rearward strap is detached from said rear anchor.

12. The apparatus of claim 1, wherein said wheel assembly extends from front anchor to said rear anchor and covers a portion of said footing.

13. The apparatus of claim 1, wherein said wheel comprises polyurethane.

14. The apparatus of claim 1, wherein each of said straps comprises polyester webbing and a hook-and-loop fastener.

15. The apparatus of claim 1, wherein said base comprises a front slot extending along a front edge thereof and a rear slot extending along a rear edge thereof, wherein said anchored end of said frontward strap is attached to said frontward strap after having passed through said front slot, and wherein said anchored end of said rearward strap is attached to said rearward strap after having passed through said rear slot.

16. The apparatus of claim 1, wherein said first and second sidewalls project in a rearward direction along which said rearward strap extends.

17. The apparatus of claim 1, further comprising a loop, wherein said free end of said frontward strap loops through said loop and wherein, when said wheel assembly is connected to said front anchor, a free end of said front anchor loops through said loop.

18. The apparatus of claim 1, wherein said rearward strap is longer than said frontward strap.

19. The apparatus of claim 1, wherein said chordophone case is configured to accommodate a guitar.

* * * * *